US012517546B1

(12) United States Patent
Lu et al.

(10) Patent No.: US 12,517,546 B1
(45) Date of Patent: Jan. 6, 2026

(54) SKEW DETECTION AND CORRECTION OF COMPLEMENTARY CLOCK SIGNALS

(71) Applicant: Marvell Asia Pte Ltd, Singapore (SG)

(72) Inventors: Quanli Lu, Coto de Caza, CA (US); Liang Fan, Irvine, CA (US); Afshin Mellati, Aliso Viejo, CA (US); Espen Olsen, Tustin, CA (US); Linghsiao Jerry Wang, Irvine, CA (US); Cindra Abidin, Irvine, CA (US)

(73) Assignee: Marvell Asia Pte Ltd, Singapore (SG)

( * ) Notice: Subject to any disclaimer, the term of this patent is extended or adjusted under 35 U.S.C. 154(b) by 106 days.

(21) Appl. No.: 18/233,542

(22) Filed: Aug. 14, 2023

Related U.S. Application Data

(60) Provisional application No. 63/419,944, filed on Oct. 27, 2022.

(51) Int. Cl.
*G06F 1/00* (2006.01)
*G06F 1/10* (2006.01)

(52) U.S. Cl.
CPC .................................. *G06F 1/10* (2013.01)

(58) Field of Classification Search
CPC ....................................................... G06F 1/10
See application file for complete search history.

(56) References Cited

U.S. PATENT DOCUMENTS

| 7,765,425 | B1 * | 7/2010 | Searles | ..................... G06F 1/10 713/401 |
| 2012/0311372 | A1 * | 12/2012 | Iijima | ....................... G06F 1/10 713/503 |
| 2019/0058576 | A1 * | 2/2019 | Lim | ....................... H04L 7/0334 |
| 2019/0384349 | A1 * | 12/2019 | Guthaus | ................ G06F 30/394 |
| 2020/0401178 | A1 * | 12/2020 | Jung | ........................... G06F 1/08 |
| 2025/0036158 | A1 * | 1/2025 | Lin | ........................... G06F 1/08 |

* cited by examiner

*Primary Examiner* — Mohammed H Rehman

(57) ABSTRACT

A first network device includes a pair of clock tree circuits, a feedback path, and a transceiver. The pair of clock tree circuits is configured to generate output clock signals, which are complementary to each other. The feedback path includes a skew detection circuit and a gain amplifier. The skew detection circuit detects a skew in the output clock signals and generates a pair of voltage signals based on a voltage-to-current and a current-to-voltage conversion of the output clock signals. The pair of voltage signals is indicative of the skew between the output clock signals. The gain amplifier amplifies the pair of voltage signals and, based on the amplified pair of voltage signals, adjusts respective delays in the output clock signals. The transceiver, based on the output clock signals, controls transfer of data to or from a second network device that is separate from the first network device.

21 Claims, 9 Drawing Sheets

SKEW DETECTION AND CORRECTION OF COMPLEMENTARY CLOCK SIGNALS

CROSS-REFERENCE TO RELATED APPLICATIONS

This application claims the benefit of U.S. Provisional Application No. 63/419,944, filed on Oct. 27, 2022. The entire disclosures of the applications referenced above are incorporated herein by reference.

FIELD

The present disclosure relates to circuits for correcting complementary clock skew in high-speed communication systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High-speed communication systems can include transceivers and receivers having circuits with complementary metal-oxide semiconductor (CMOS) transistors (referred to as "CMOS circuits"). The CMOS transistors can be used in amplifiers, filters, inverters, gates, buffers, etc. The CMOS circuits implement CMOS signaling, which includes the transmission of data signals using a first differential CMOS circuit in a transceiver and reception of the data signal at a receiver using a second differential CMOS circuit. The CMOS circuits are used for high-speed and/or long-range transmissions.

SUMMARY

A first network device is disclosed and includes a pair of clock tree circuits, a feedback path, and a transceiver. The pair of clock tree circuits is configured to generate a first output clock signal and a second output clock signal. The feedback path includes a skew detection circuit and a gain amplifier. The skew detection circuit is configured to detect a skew in the first output clock signal and the second output clock signal and generate a pair of voltage signals based on a voltage-to-current and a current-to-voltage conversion of the first output clock signal and the second output clock signal. The pair of voltage signals is indicative of the skew between the first output clock signal and the second output clock signal. The second output clock signal is complementary to the first output clock signal. The gain amplifier is configured to amplify the pair of voltage signals and, based on the amplified pair of voltage signals, to adjust respective delays in the first output clock signal and the second output clock signal. The transceiver is configured, based on the first output clock signal and the second output clock signal, to control transfer of data to or from a second network device. The second network device is separate from the first network device.

In other features, the skew detection circuit includes: a voltage-to-current conversion circuit configured to receive the first output clock signal and the second output clock signal, and to convert voltages of the first output clock signal and the second output clock signal to provide a pair of current signals; and a current-to-voltage conversion circuit configured to convert the pair of current signals to the pair of voltage signals.

In other features, the voltage-to-current conversion circuit includes a stack of cross-coupled transistors configured to receive and convert voltages of the first output clock signal and the second output clock signal to the pair of current signals.

In other features, the stack of cross-coupled transistors include: a first transistor; a second transistor; a third transistor cross-coupled with the second transistor, gates of the second transistor and the third transistor configured to receive the second output clock signal; and a fourth transistor cross-coupled with the first transistor, gates of the fourth transistor and the first transistor configured to receive the first output clock signal.

In other features, the stack of cross-coupled transistors are connected between a first source terminal at a first voltage potential and a pair of output terminals, the pair of output terminals providing the pair of voltage signals.

In other features, the current-to-voltage conversion circuit includes a resistor capacitor (RC) circuit configured to convert the pair of current signals to the pair of voltage signals.

In other features, the voltage-to-current conversion circuit includes a first output terminal and a second output terminal. The RC circuit includes: a first RC circuit implemented as a first load on the first output terminal; and a second RC circuit implemented as a second load on the second output terminal.

In other features, the first RC circuit includes a first resistor and a first capacitor, the first resistor and the first capacitor being connected in parallel. The second RC circuit includes a second resistor and a second capacitor, the second resistor and the second capacitor being connected in parallel.

In other features, the voltage-to-current conversion circuit includes a first output terminal and a second output terminal. The current-to-voltage conversion circuit includes: a first resistor implemented as a first load on the first output terminal; a second resistor implemented as a second load on the second output terminal; and a capacitor connected across the first output terminal and the second output terminal.

In other features, the first network device further includes a stabilizing circuit configured to stabilize the pair of voltage signals including minimizing a common mode response variation of the pair of voltage signals.

In other features, the stabilizing circuit includes: a sensor configured to detect a voltage, the voltage being based on the pair of voltage signals; and an amplifier configured to compare the voltage to a reference voltage, and to control current supplied to the voltage-to-current conversion circuit based on a result of the comparison.

In other features, the voltage-to-current conversion circuit includes a first output terminal and a second output terminal. The current-to-voltage conversion circuit includes a capacitor connected across the first output terminal and the second output terminal. The sensor is implemented as a voltage divider connected in parallel with the capacitor.

In other features, the amplifier is configured to control current supplied to the voltage-to-current conversion circuit to provide a common mode response of the pair of voltage signals that remains at a constant value for a linear operating range of a differential mode response of the pair of voltage signals.

In other features, the voltage-to-current conversion circuit is connected to a first source terminal and to a pair of output terminals. The current-to-voltage conversion circuit is connected to a second source terminal and to the pair of output terminals. The pair of output terminals output the pair of voltage signals.

In other features, the first output clock signal and the second output clock signal are pseudo-differential clock signals.

In other features, the first network device further includes a pair of input delay buffers configured to receive a pair of complementary clock signals. The pair of clock tree circuits are connected to receive outputs of the pair of input delay buffers and are configured, based on the outputs, to generate the first output clock signal and the second output clock signal.

In other features, the gain amplifier is configured to adjust delay of the pair of input delay buffers based on the amplified pair of voltage signals to align the first output clock signal to the second output clock signal.

In other features, the pair of input delay buffers include a first input delay buffer and a second input delay buffer. The pair of clock tree circuits include: a first clock tree circuit including a first amplifiers connected in series and amplifying an output of the first input delay buffer; and a second clock tree circuit including a second amplifiers connected in series and amplifying an output of the second input delay buffer.

In other features, the first amplifiers and the second amplifiers amplify current.

In other features, the first amplifiers increase in size from the first input delay buffer to a first output terminal of a first one of the pair of clock tree circuits and have different levels of amplification. The second amplifiers increase in size from the second input delay buffer to a second output terminal of a second one of the pair of clock tree circuits and have different levels of amplification.

In other features, the pair of input delay buffers include: a first input delay buffer configured to receive a first complementary clock signal of the pair of complementary clock signals; and a second input delay buffer configured to receive a second complementary clock signal of the pair of complementary clock signals, the second complementary clock signal having an opposite polarity than the first complementary clock signal. The pair of clock tree circuits include: a first clock tree circuit configured to process an output of the first input delay buffer to generate the first output clock signal with a first phase; and a second clock tree circuit configured to process an output of the second input delay buffer to generate the second output clock signal with a second phase. The skew detection circuit is configured to detect at least one error in at least one of the first phase and the second phase. The gain amplifier is configured to amplify the at least one error and adjust at least one of a delay of the first input delay buffer and a delay of the second input delay buffer to align the first output clock signal to the second output clock signal.

In other features, circuitry of a skew detector is disclosed. The circuit includes an input sub-circuit including two arms of stacked transistors. A first arm of stacked transistors includes two transistors connected in series between a Vdd terminal and a first output terminal. A second arm of stacked transistors includes two transistors connected in series between the Vdd terminal and a second output terminal. A first transistor of the first arm and a second transistor of the second arm share a first common gate terminal being inputted with a first clock signal. A second transistor of the first arm and a first transistor of the second arm share a second common gate terminal being inputted with a second clock signal. The circuit also includes an output sub-circuit having a first load component connected between the first output terminal and a Vss terminal and a second load component connected between the second output terminal and the Vss terminal. The first clock signal is pseudo complementary to the second clock with a skew in a period of clock cycle to induce a current pulse across the stacked transistors being converted to a first output voltage via the first load component and a second output voltage via the load component. The skew is detected at least by a differential mode output response of the first output voltage and the second output voltage.

In other features and in the input sub-circuit, the first transistor of the first arm and the first transistor of the second arm share a common first terminal connected to the Vdd terminal. The first transistor of the first arm has a second terminal connected to a first terminal of the second transistor of the first arm. The first transistor of the second arm has a second terminal connected to a first terminal of the second transistor of the second arm. The second transistor of the first arm has a second terminal connected to the first output terminal. The second transistor of the second arm has a second terminal connected to the second output terminal.

In other features, the circuit further includes an adjustable current source coupled between the Vdd terminal and the common first terminal of the stacked transistors. The adjustable current source is configured to receive the feedback signal to control a combined current passing through the two arms of stacked transistors to be a constant to further make the common mode output voltage to be independent of variation of the skew.

In other features, the circuit further includes a sensor sub-circuit having two resistors connected in series between the first output terminal and the second output terminal. The two resistors share a common terminal as a sensing node to sense a common mode output voltage.

In other features, the circuit further includes an op-amp configured to compare the sensed common mode output voltage with a reference voltage and to generate a feedback signal based on error detected between the sensed common mode output voltage and the reference voltage.

In other features, the output sub-circuit includes a first capacitor connected in parallel with a first resistor forming a first resistor capacitor (RC) unit as a low-pass loading at the first output terminal to convert the current pulse into the first output voltage and a second capacitor connected in parallel with a second resistor forming a second RC unit as a low-pass loading at the second output terminal to convert the current pulse into the second output voltage.

In other features, each transistor in the two arms of stacked transistors is one selected from a PMOS transistor, a NMOS transistor, a n-type bipolar transistor, a p-type bipolar transistor.

In other features, an apparatus is disclosed for aligning two complementary clock signals. The apparatus includes a first delay component with a first input to receive a first clock signal. The apparatus further includes a second delay component with a second input to receive a second clock signal, the second clock signal having opposite polarity of the first clock signal. Additionally, the apparatus includes a first clock tree component to process the first clock signal to generate a first clock output signal with a first period of cycle. The apparatus further includes a second clock tree component to process the second clock signal to generate a second clock output signal with a second period of cycle. Furthermore, the apparatus includes a skew detector of claim 1 configured to input the first clock output signal and the second clock output signal to detect respective errors in the first period of cycle and the second period of cycle. Moreover, the apparatus includes a gain stage configured to amplify the respective errors to send feedback signals to the first delay component to adjust the first clock signal and respectively to the second delay component to adjust the second clock signal so that the first period of cycle is accurately aligned with the second period of cycle to yield two complementary clocks.

In other features, the skew detector, the gain stage, and the first delay component or the second delay component form a feedback loop implemented in analog way.

In other features, the skew detector, the gain stage, and the first delay component or the second delay component form a feedback loop implemented in digital manner.

In other features, a method for detecting PN skew of a pair of complementary clock signals is provided. The method includes a step of inputting a first clock signal and a second clock signal respectively to two gate terminals of two cross-linked transistors in two arms of stacked transistors. The two arms in one end being commonly connected to a first source terminal Vdd and respectively ended with a first output terminal and a second output terminal. The first clock signal and the second clock signal are a pair of pseudo complementary clocks. The method further includes a step of coupling a first resistor between the first output terminal and a second source terminal Vss and a second resistor between the second output terminal and the terminal Vss. Additionally, the method includes a step of drawing a current pulse through the two arms of stacked transistors respectively to the first output terminal and the second output terminal due to a skew associated with the first clock signal and the second clock signal in each period of clock cycle. Furthermore, the method includes a step of converting the current pulse to a first output voltage at the first output terminal and to a second output voltage at the second output terminal. Moreover, the method includes a step of deducing a differential mode output of the first output voltage and the second output voltage which expresses a strong correlated response to the skew.

In other features, the step of drawing a current pulse includes connecting a first capacitor in parallel to a first resistor to form a first RC unit and connecting a second capacitor in parallel to a second resistor to form a second RC unit; drawing the current pulse via the first resistor as a low-pass loading at the first output terminal and via the second resistor as a low-pass loading at the second output terminal.

In other features, a first transistor in a first arm and a first transistor in the second arm share a common first terminal connected to the source terminal Vdd. The first transistor in the first arm has a second terminal connected to a first terminal of a second transistor in the first arm. The first transistor of the second arm has a second terminal connected to a first terminal of a second transistor in the second arm. The second transistor in the first arm has a second terminal connected to the first output terminal. The second transistor in the second arm has a second terminal connected to the second output terminal.

In other features, the method further includes a step of adding a sensor sub-circuit including two resistors coupled in series between the first output terminal and the second output terminal. The method further includes a step of sensing a common mode output voltage at a common middle terminal between the two resistors.

In other features, the method further includes a step of comparing the common mode output voltage with a reference voltage at an op-amp to detect an error signal caused by variations of the current pulse flowing through the two arms of stacked transistors due to the skew and drain-to-source voltage squeeze across the stacked transistors due to extra common mode output voltage, and to generate a feedback signal.

In other features, the method further includes a step of inserting an adjustable current source between the common first terminal of the first transistor in the first arm and the first transistor in the second arm and the source terminal Vdd and a step of adjusting current based on the feedback signal to maintain the current pulse flowing into the stacked transistors to be constant to eliminate dependence of the common mode output voltage on the skew.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused indifferent figures to identify similar and/or identical elements.

DESCRIPTION

CMOS circuits of transceivers and receivers of high-speed wireline systems require clocking circuitry to provide complementary clock signals for timing transmission and reception of data signals. Requirements of the clocking circuitry are becoming more stringent. For example, there is demand for clocking circuitry that consumes less power and provides more precise complementary clock signals. The precision of complementary clock signals refers to the alignment and thus timing of rising and falling edges of the complementary clock signals relative to each other.

In order to minimize power consumption, and for various other reasons such as signal integrity, complementary CMOS signaling is used. Complementary CMOS signaling refers to the generation of complementary clock signals clkp and clkn for the transmission of data using CMOS circuitry. The complementary clock signals clkp, clkn transition between ground and respective supply voltages. For example, clkp may swing from ground to a positive supply voltage Vdd while clkn may swing from a positive supply voltage Vdd to ground at the same time. The only current consumption happens at clock transitions, which as a result minimizes power usage.

Figure 1:
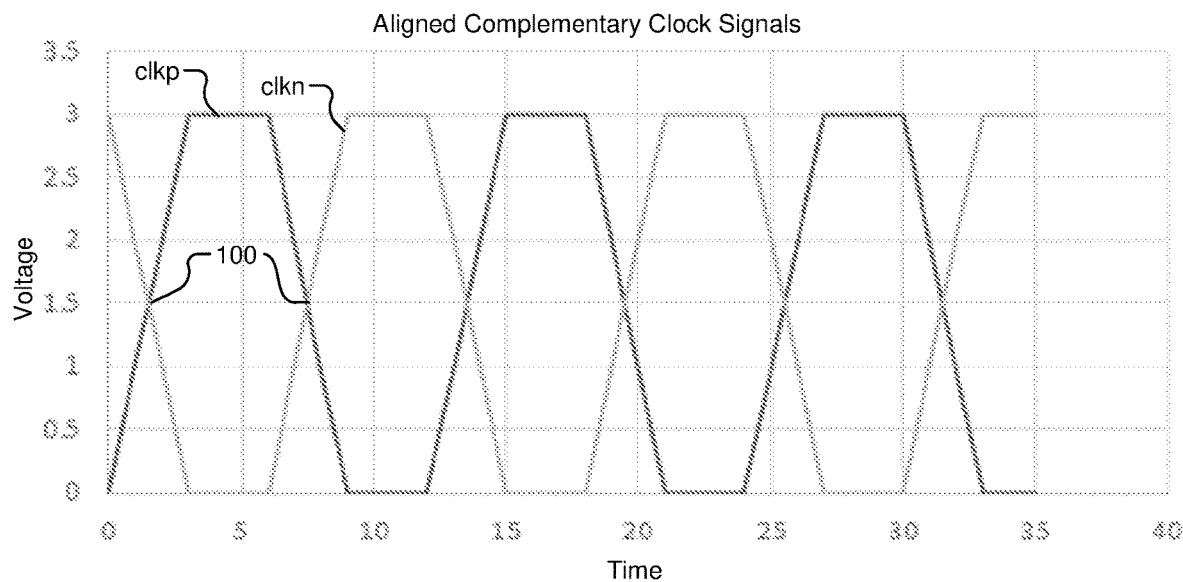
FIG. 1 is an example plot of aligned complementary clock signals clkp and clkn.

FIG. 1 shows an example pair of aligned complementary clock signals clkp and clkn. Rising edges of the positive clock signal clkp and falling edges of negative clock signal clkn are aligned and have corresponding cross over points 100, which are located at a magnitude centered between maximum and minimum voltages of the complementary clock signals clkp and clkn when the complementary signals clkp and clkn are aligned. For example, the complementary clock signals clkp and clkn are centered at 1.5 V and have voltage swings between 0 and 3.0 V. The term "complementary" refers to two signals having the same voltage maximums and minimums and phase shifted relative to each other such that at any moment in time the voltage of the first signal is i) swinging in an opposite direction as the voltage of the second signal, or ii) remains constant. Similarly, at any moment in time, the voltage of the second signal i) swings in an opposite direction as the voltage of the first signal, or ii) remains constant. For example, the voltage of the first signal may be increasing or remaining constant while the voltage of the second signal is decreasing or remaining constant.

Figure 2:
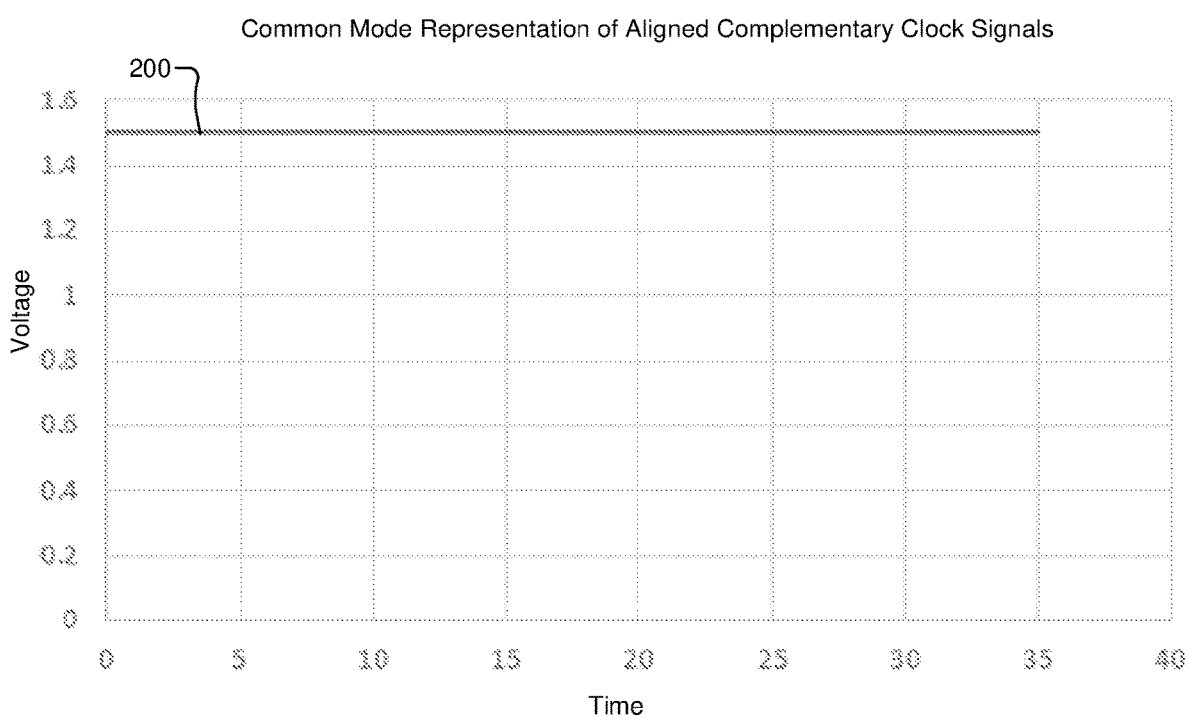
FIG. 2 is a common mode representation plot for the aligned complementary clock signals clkp and clkn of FIG. 1.
Figure 3:
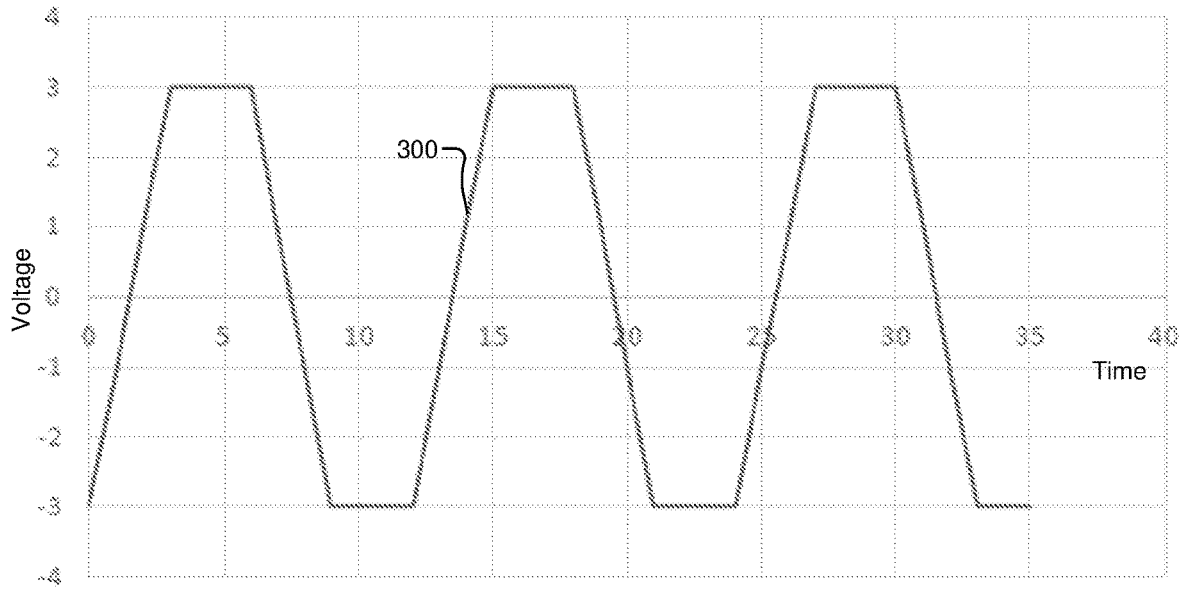
FIG. 3 is an example differential mode representation plot of the aligned complementary clock signals clkp and clkn of FIG. 1.

A common mode of the complementary clock signals clkp and clkn is a constant value, as represented by curve 200 of FIG. 2. The common mode of the complementary clock signals clkp and clkn refers to an average of the complementary clock signals clkp and clkn (i.e., (clkp+clkn)/2). A differential mode of the complementary clock signals clkp and clkn is a difference between the complementary clock signals clkp and clkn (i.e., clkp-clkn), as represented by curve 300 of FIG. 3. The differential mode curve 300 has twice the swing in voltage magnitude as one of the complementary clock signals clkp and clkn. Each of the complementary clock signals clkp and clkn of FIG. 1 is referred to as single ended clock signals because it has a voltage swing, for example, above 0. This is different than the curve 300, which has voltage swing above and below 0.

The complementary clock signals clkp and clkn may be referred to as pseudo-differential clock signals if generated separately and independently such that, for example, no differential circuit components (e.g., differential buffers) are used to generate the complementary clock signals clkp and clkn. The pseudo-differential clock signals are separately generated and offset in time to be complementary. This is different than complementary clock signals generated by a differential clock generator that includes differential buffers and/or amplifiers; in which case the complementary clock signals are generated based off a shared current source. A differential clock generator utilizes a shared current source and as a result consumes more power than a pseudo-differential clock generation circuit due to constant current mode balancing of the differential clock generator. Power consumption of a pseudo-differential clock generation circuit is dynamic and the resultant average amount of power consumed is less.

When complementary clock signals clkp and clkn are not aligned, skew exists between clkp and clkn such that the cross-over points of clkp and clkn are not centered between the maximum and minimum voltages of clkp and clkn. Skew refers to a difference in phase between the complementary clock signals clkp and clkn.

Figure 4:
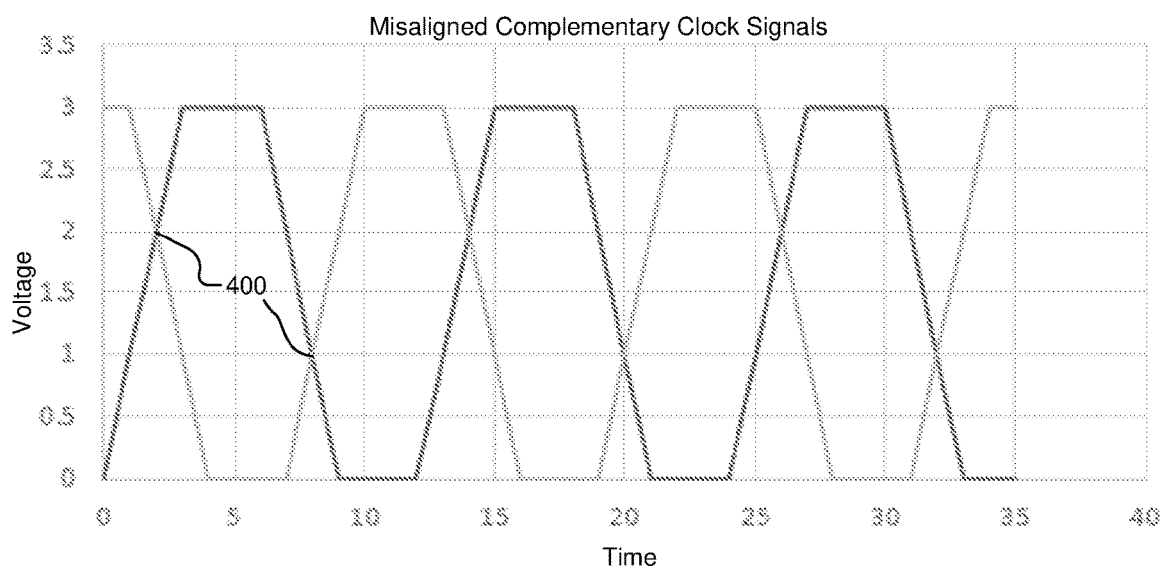
FIG. 4 is an example plot of misaligned complementary clock signals clkp and clkn.

FIG. 4 shows an example of complementary clock signals clkp and clkn that are not aligned such that skew exists. The complementary clock signals clkp and clkn may be pseudo-differential clock signals. The cross-over points 400 of the complementary clock signals clkp and clkn are not centered between maximum and minimum voltages of clkp and clkn. In the example of FIG. 4, the center voltage between the maximum and minimum voltages of clkp and clkn is 1.5 V, whereas the voltages of the cross-over points of the depicted signals are 2.0 V and 1.0 V respectively.

Figure 5:
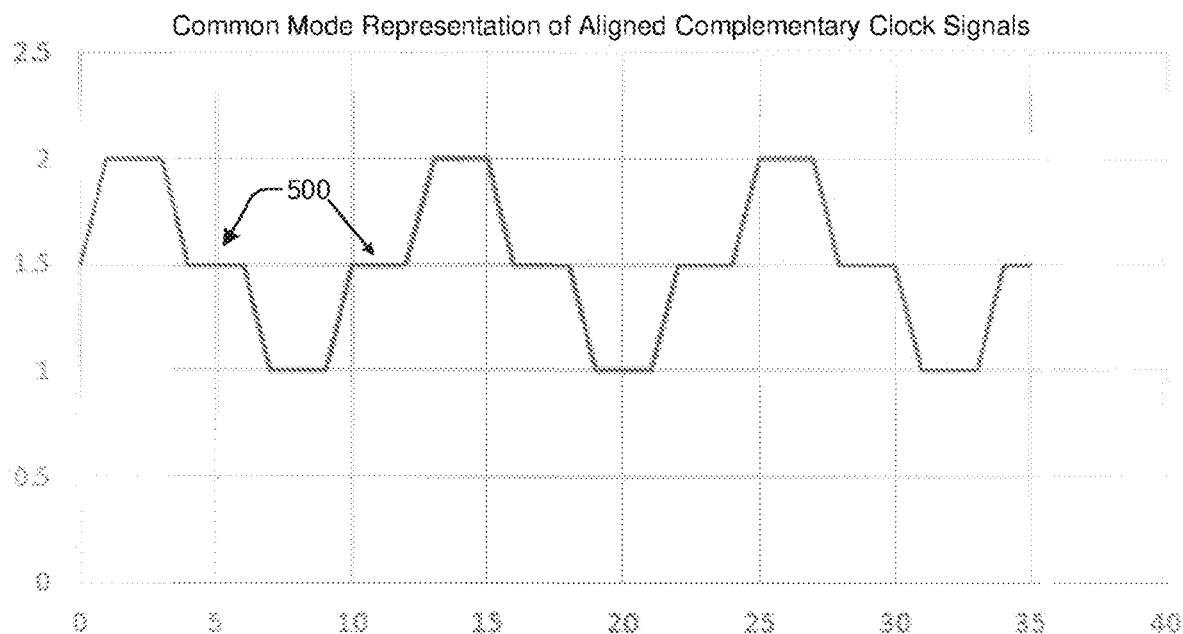
FIG. 5 is a common mode representation plot for the misaligned complementary clock signals clkp and clkn of FIG. 4.
Figure 6:
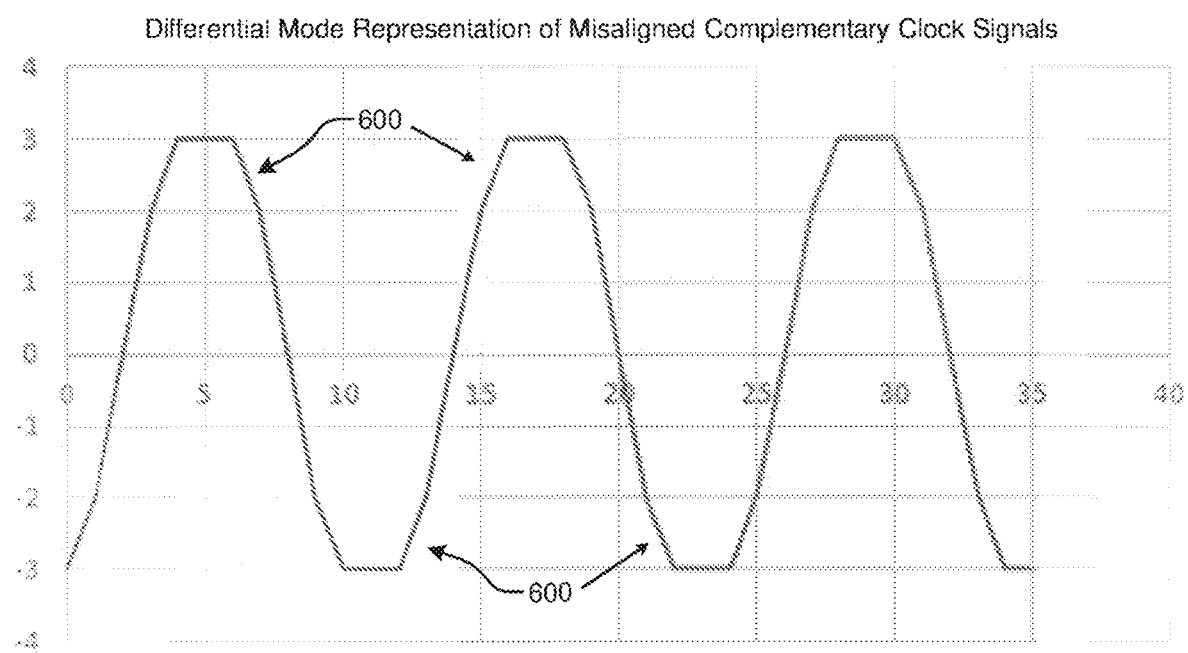
FIG. 6 is an example differential mode representation plot of the misaligned complementary clock signals clkp and clkn of FIG. 4.

FIG. 5 shows a common mode representation of the misaligned complementary clock signals clkp and clkn of FIG. 4. The common mode representation has "ripples" or zero-slope portions 500 located between maximum and minimum magnitude values. FIG. 6 shows a differential mode representation of the misaligned complementary clock signals clkp and clkn of FIG. 4. The differential mode representation has "softened edges" or portions 600 with reduced slope near maximum and minimum magnitude values. The portions 500, 600 of FIGS. 5-6 are imperfections that exist due to the skew between the misaligned complementary clock signals clkp and clkn. The skew and imperfections due to the less precise complementary clock signals can negatively affect performance such as timing of component operations and detection of signal transitions.

The examples set forth herein include skew correction circuits including skew detection circuits for detecting and correcting skew of complementary clock signals, such as pseudo-differential complementary clock signals. Each skew correction circuit is configured to: receive a pair of complementary clock signals; delay and amplify the pair of complementary clock signals to provide complementary output clock signals; accurately detect skew of the complementary output clock signals via a corresponding skew detection circuit; and adjust the delay of the received pair of complementary clock signals to minimize and/or eliminate the detected skew.

Figure 7:
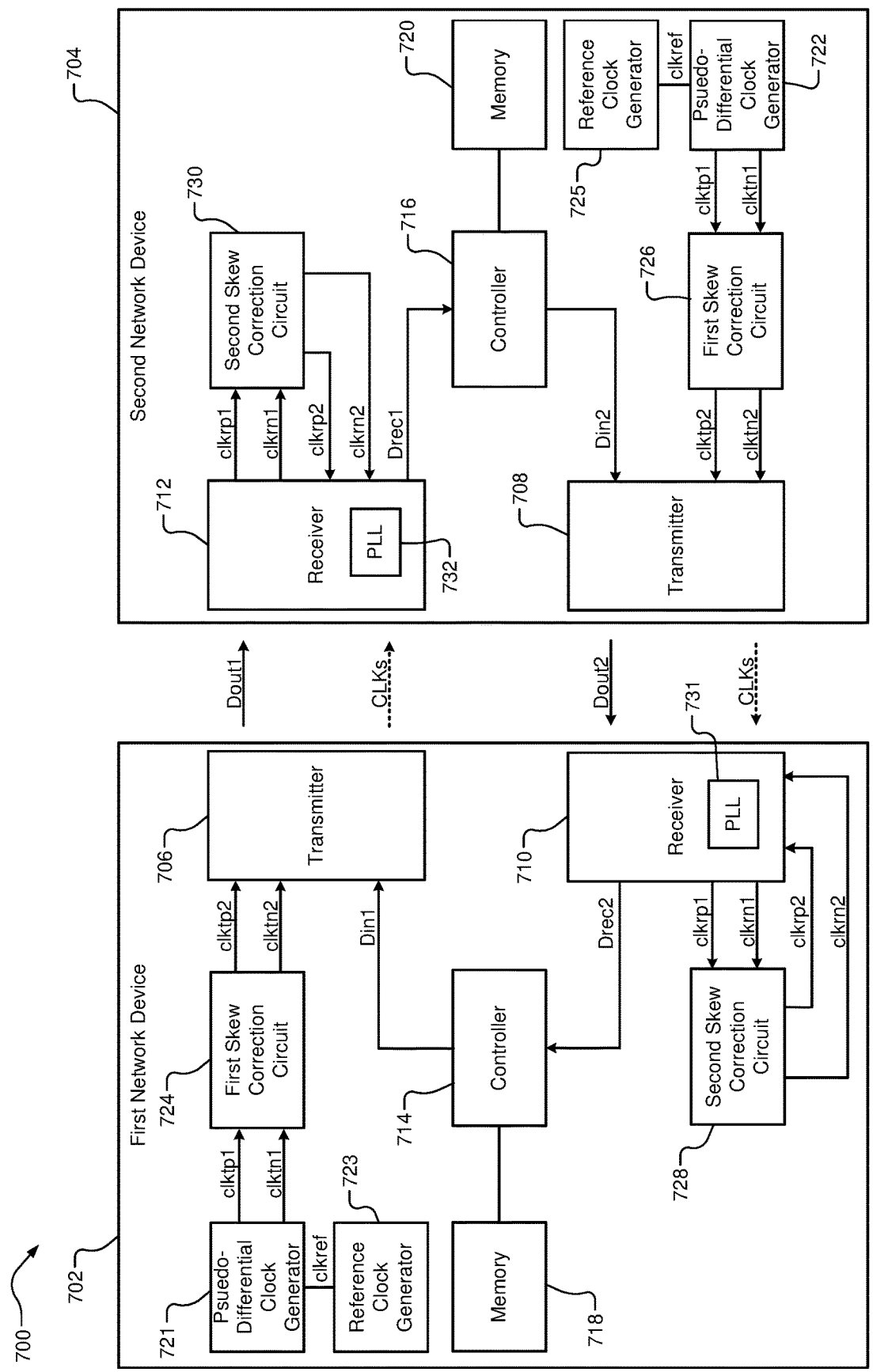
FIG. 7 is a functional block diagram of an example communication system including network devices with skew correction circuits in accordance with the present disclosure.

FIG. 7 shows a communication system 700 including network devices 702, 704 with respective transmitters 706, 708, receivers 710, 712, controllers 714, 716, and memories 718, 720. The network devices 702, 704 may be implemented as mobile phones, wearable devices, tablets, portable computers (e.g., laptop computers), and/or other network devices implementing CMOS signaling and use of complementary clock signals, such as base station devices, servers, gateway devices, switches, routers, etc. Although shown separately, other disclosed embodiments i) integrate the transmitter 706 and receiver 710 as part of a single transceiver, and ii) similarly integrate the transmitter 708 and receiver 712 as part of another single transceiver. In an embodiment, the medium over which the transmitters 706, 708 and the receivers 710, 712 communicate is a high-speed wireline or high-speed wireless communication medium.

The controllers 714, 716 control transmission and reception of data transmitted between the network devices 702, 704 via the transmitters 706, 708 and the receivers 710, 712. Each of the controllers 714, 716 may refer to one or more processors and memory, where the one or more processors are configured to execute instructions to perform the described operations. The instructions may be stored in the memory of the one or more processors. The term "controller" may be replaced with the term "circuit". The memory of the one or more processors may be implemented as non-transitory, tangible computer-readable medium.

The network devices 702, 704 further include respective pseudo-differential clock generators 721, 722, first skew correction circuits 724, 726, and second skew detection circuits 728, 730. Each of the pseudo-differential clock generators 721, 722 generates a respective pair of pseudo-differential complementary clock signals clktp1, clktn1. As an example, each of the pseudo-differential clock generators 721, 722 includes and/or operates as a phase lock loop (PLL) circuit and locks in phase of the corresponding pseudo-differential complementary clock signals clktp1, clktn1. In one embodiment, this occurs based on, for example, one or more reference clock signals clkref generated by a reference clock generator. Example reference clock generators 723, 725 are shown. In another embodiment, the reference clock generators 723, 725 are not included. As yet another alternative embodiment, the pseudo-differential clock generators 721, 722 are replaced by differential clock generators that generate differential complementary clock signals.

Figure 8:
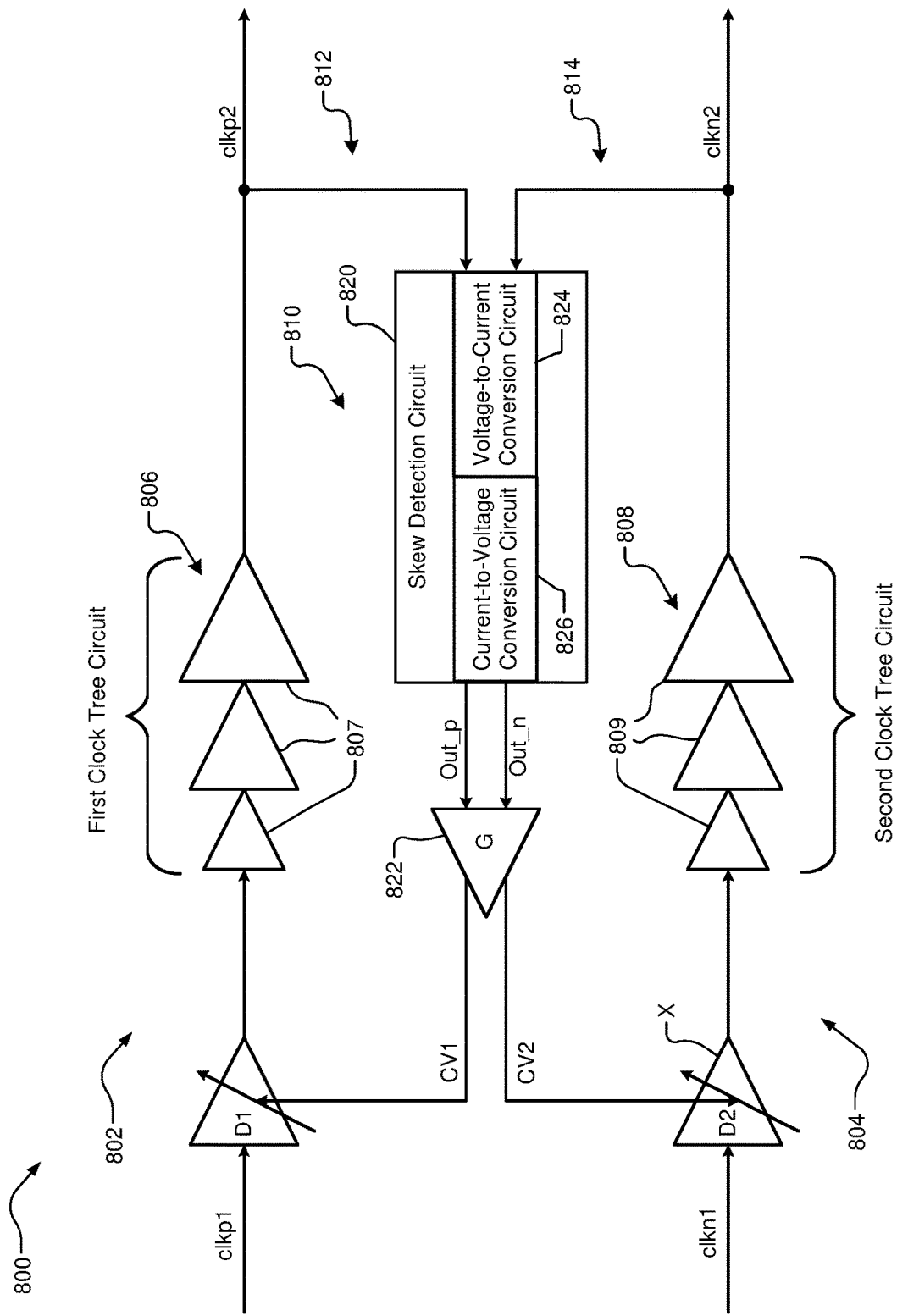
FIG. 8 is a schematic view of an example skew correction circuit in accordance with the present disclosure.

In an embodiment, each of the first skew correction circuits 724, 726 and second skew detection circuits 728, 730 is implemented as the example skew detection circuit shown in FIG. 8. The first skew correction circuits 724, 726 detects skew of a corresponding one of the pairs of pseudo-differential complementary clock signals clktp2, clktn2 and adjusts delay of received pseudo-differential complementary clock signals clktp1, clktn1 output from the first skew correction circuits 724, 726 to minimize and/or eliminate the skew. This results in aligned pseudo-differential complementary clock signals clktp2, clktn2, which are provided to the transmitters 706, 708. The transmitters 706, 708 implement CMOS signaling to transmit data based on the aligned pseudo-differential complementary clock signals clktp2, clktn2.

The receivers 710, 712 receive data signals including the transmitted data. The receivers 710, 712 generate complementary clock signals clkrp1, clkrn1 based on the received data signals and/or one or more clock signals CLKs transmitted from the transmitters 706, 708 to the receivers 710, 712. In an embodiment, the one or more clock signals CLKs are transmitted by the transmitters 706, 708 and include or are generated based on the complementary clock signals clktp2, clktn2. The second skew detection circuits 728, 730 detect skew of a corresponding one of the pairs of pseudo-differential complementary clock signals clkrp2, clkrn2 output from the second skew detection circuits 728, 730 and adjust delay of received pseudo-differential complementary clock signals clkrp1, clkrn1 to minimize and/or eliminate the skew. This results in aligned pseudo-differential complementary clock signals clktp2, clktn2, which are provided to the receivers 710, 712. The receivers 710, 712 determine timing of the received data signals based on the aligned pseudo-differential complementary clock signals clktp2, clktn2. In an example embodiment, the receivers 710, 712 include phase lock loop (PLL) circuits 731, 732, which lock in timing of the received data signals based on the aligned pseudo-differential complementary clock signals clktp2, clktn2.

FIG. 8 shows a skew correction circuit 800 that includes two parallel conversion paths 802, 804. Each of the parallel conversion paths 802, 804 includes a respective one of variable delay buffers D1, D2 and a respective one of clock tree circuits 806, 808. The clock tree circuits 806, 808 are connected in series with the variable delay buffers D1, D2. In an embodiment, the clock tree circuit 806 is implemented as a series of current amplifiers 807 and the clock tree circuit 808 is implemented as a series of current amplifiers 809. The inclusion of the current amplifiers 807, 809 allows the skew correction circuit 800 to output the aligned pseudo-differential complementary clock signals clkp2, clkn2 to a load having a high input impedance. As an example, an array of gates and/or switches of a driver and/or transmitter downstream from the skew correction circuit 800 can have large input parasitic capacitance. In the example shown, each of the clock tree circuits 806, 808 includes a set of three current amplifiers connected in series but may include any number of current amplifiers. In an embodiment, the current amplifiers are implemented as inverters that increase in size from the delay buffers D1, D2 to the output of the skew correction circuit 800. This increase in size of the inverters gradually increases the current output of the clock tree circuits 806, 808. The larger the inverter, the larger the input capacitance can be of the downstream driver and/or transmitter.

Figure 9:
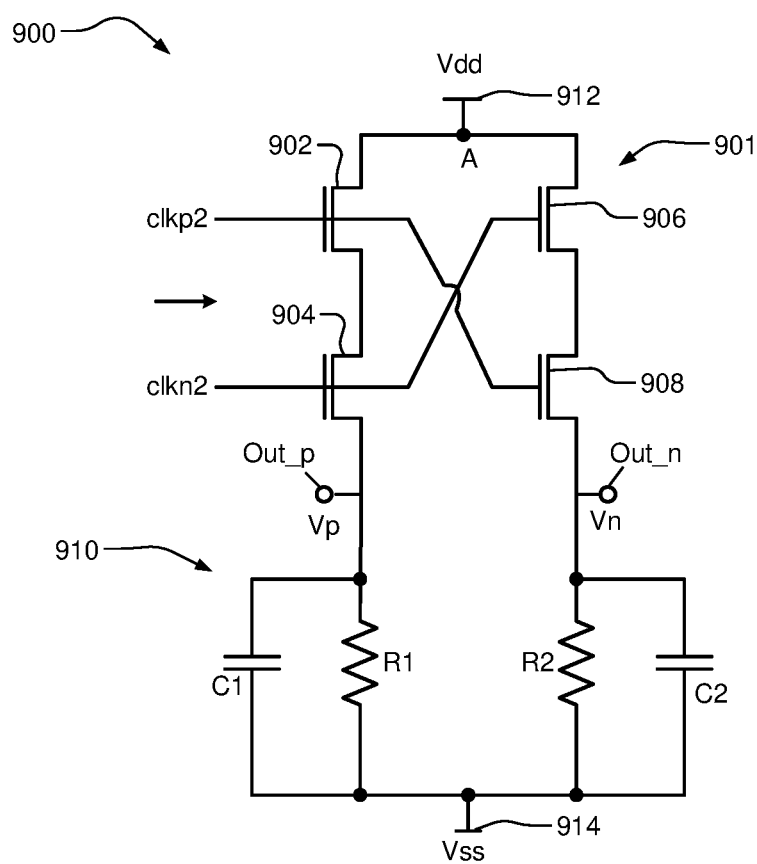
FIG. 9 is an example schematic view of an example skew detection circuit in accordance with the present disclosure.
Figure 11:
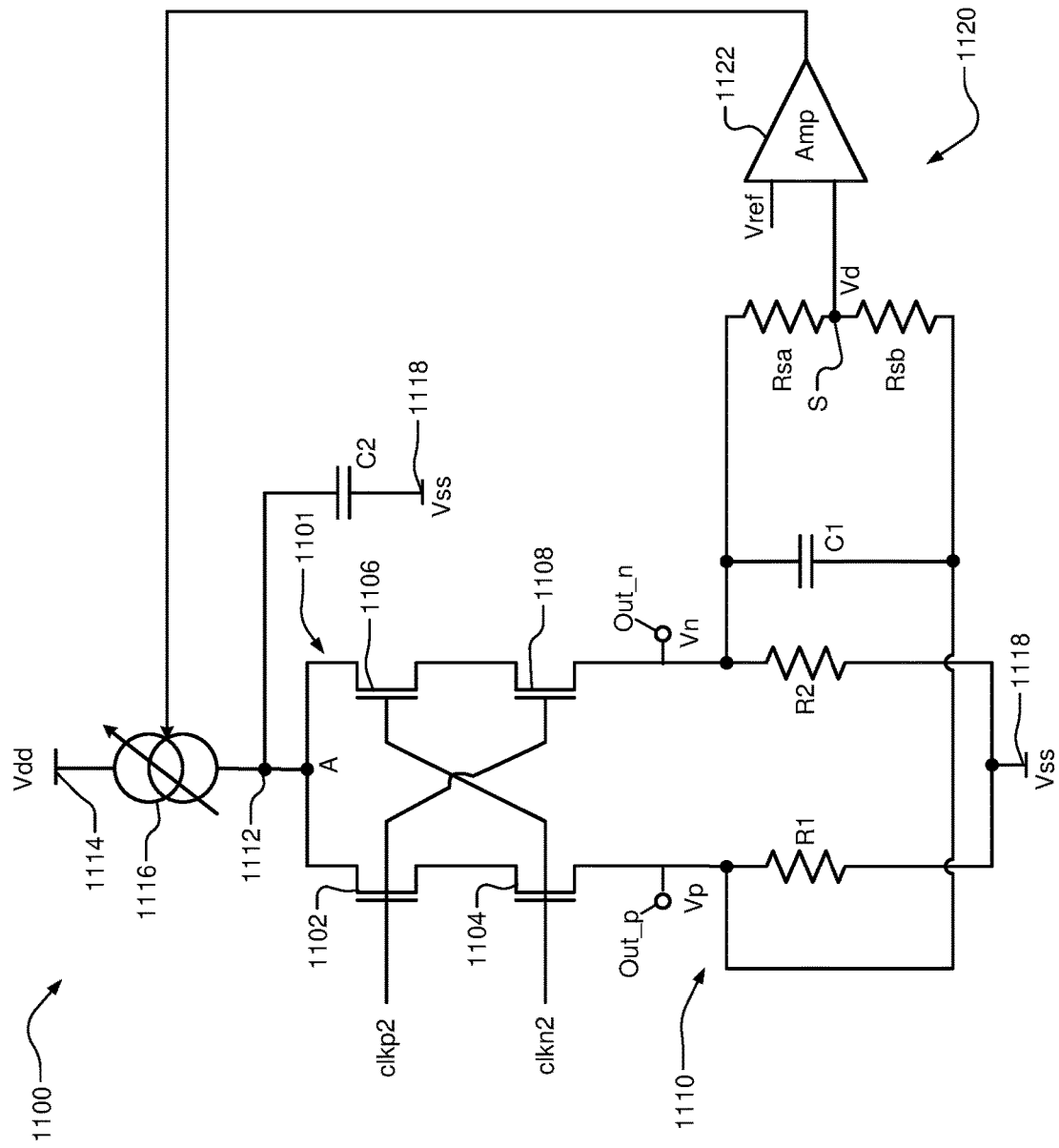
FIG. 11 is an example of another skew detection circuit including a common-mode stabilization circuit in accordance with the present disclosure.

A differential feedback path 810 is connected to each of the parallel conversion paths 802, 804 and provides two feedback loops 812, 814, which correct phase alignment errors of the complementary clock signals clkp2, clkn2. The feedback loops 812, 814 can be implemented as analog or digital feedback loops. The differential feedback path 810 includes a skew detection circuit 820 and a differential gain amplifier 822. Examples of the skew detection circuit 820 are shown in FIGS. 9 and 11. The skew detection circuit 820 detects skew between the complementary clock signals clkp2, clkn2 and represents the skew as differential feedback voltages signals out_p, out_n, which are provided to the gain amplifier 822. The skew detection circuit 820 generates the differential feedback voltages signals out_p, out_n based on detected errors of alignment (or skew) associated with the two complementary clock signals clkp2, clkn2. In an embodiment, the skew detection circuit 820 includes a voltage-to-current conversion circuit 824 and a current-to-voltage conversion circuit 826, examples of which are shown in FIGS. 9 and 11.

The gain amplifier 822 amplifies the differential feedback voltages signals out_p, out_n (or phase error) to generate differential control voltages CV1, CV2, which are provided respectfully to the delay buffers D1, D2 to adjust the delay of the complementary clock signals clkp1, clkn1. The complementary clock signals clkp1, clkn1 are received as inputs to the delay buffers D1, D2. The respective delays of the complementary clock signals clkp1, clkn1 are adjusted to align the complementary clock signals clkp2, clkn2.

The delay (or phase) adjusted complementary clock signals out of the delay buffers D1, D2 are distributed through the clock tree circuits 806, 808 to be amplified and shaped to provide the complementary clock signals clkp2, clkn2. Sharp edges of the complementary clock signals are rounded to provide more sinusoidal-shaped clock signals through the clock tree circuits 806, 808. Each pair of complementary clock signals referred to herein is a pair of PN (positive negative) clock signals, which may have skew (referred to as PN skew). When the PN clock signals clkp2, clkn2 have PN skew, the PN skew is detected and corrected. The skew detection circuit 820 does not alter the delay of the delay buffers D1, D2 when the complementary clock signals clkp2, clkn2 are aligned and thus there is no skew. In an embodiment, the skew detection circuit 820 maintains voltages and/or current levels of differential feedback voltages signals out_p, out_n at constant levels when there is no skew.

FIG. 9 shows a skew detection circuit 900 that is a low-power PN skew detector and accurately detects skew of complementary clock signals, such as the complementary clock signals clkp2, clkn2 of FIG. 8. The skew detection circuit 900 that includes i) an input sub-circuit 901 with cross-coupled and stacked transistors 902, 904, 906, 908, and ii) an RC circuit 910. The input sub-circuit 901 operates as a voltage-to-current conversion circuit. A gate of transistor 902 is connected to a gate of transistor 908. A gate of transistor 904 is connected to a gate of transistor 906.

The RC circuit 910 operates as a current-to-voltage conversion circuit. The transistors 902, 904 provide a first arm of the input sub-circuit 901. The transistors 906, 908 provide a second arm of the input sub-circuit 901. The RC circuit 910 includes a first resistor R1 connected in parallel with a first capacitor C1 and a second resistor R2 connected in parallel with a second capacitor C2. First terminals (e.g., source terminals) of transistors 902, 906 are connected to a first source terminal 912, which is at a first voltage potential Vdd. Second terminals (e.g., drain terminals) of transistors 902, 906 are connected respectively to first terminals (e.g., source terminals) of transistors 904, 908. The second terminal (e.g., drain terminal) of transistor 904 is connected to resistor R1 and capacitor C1. The resistor R1 and capacitor C1 are connected between the transistor 904 and a second source terminal 914, which is at a second voltage potential Vss. The second terminal (e.g., drain terminal) of transistor 908 is connected to resistor R2 and capacitor C2. The resistor R2 and capacitor C2 are connected between the transistor 908 and the second source terminal 914. The cross-coupled and stacked transistors include metal-oxide-semiconductor field-effect transistors (MOSFETs), such as p-channel MOSFETs (referred to as PMOS transistors) as shown, or other transistors such as n-channel MOSFETs (referred to as NMOS transistors), n-type bipolar transistors, or p-type bipolar transistors.

The clock signal clkp2 is received at the gates of the transistors 902, 908 and the clock signal clkn2 is received at the gates of the transistors 904, 906. The first transistor 902 in the first arm is commonly gated by one clock signal clkp2 with the second transistor 908 in the second arm. The first transistor 906 in the second arm is commonly gated by one complementary clock signal clkn2 with the second transistor 904 in the first arm. The two arms of stacked transistors 902, 904, 906, 908 are cross-linked such that on one arm the clock signal clkp2 is driving the upper transistor and the complementary clock signal clkn2 is driving the lower transistor. On the other arm, the order is reversed, such that the clock signal clkn2 is driving the upper transistor and the complementary clock signal clkp2 is driving the lower transistor.

In an embodiment and for a majority of a period of a clock cycle, the two complementary clock signals clkp2 and clkn2 have opposite polarity, such that one of the stacked transistors 902, 904, 906, 908 in either arm is off (or open) while the other one of the transistors in the same arm is on (or closed). There is no current flowing through the stacked transistors 902, 904, 906, 908 if the two complementary clock signals clkp2, clkn2 are aligned (i.e., no skew between the clock signals clkp2, clkn2). This minimizes current consumption by the skew detection circuit 900. Current does periodically flow through the transistors 902, 904, 906, 908 when the two complementary clock signals clkp2, clkn2 are misaligned. When the clock signals clkp2, clkn2 cross, the transistors 902, 904, 906, 908 conduct for a short period of time and thus allow current to flow through the transistors 902, 904, 906, 908. If skew exists between the two complementary clock signals clkp2, clkn2, the rising edge of one of the clock signals (e.g., clkp2) crosses the other clock signal (e.g., clkn2) at a different voltage level than a voltage level when a falling edge of the one of the clock signals (e.g., clkp2) crosses the other clock signal (e.g., clkn2). This leads to current pulses through the stacked transistors 902, 904, 906, 908 from the first terminal Vdd to output terminals Out_p, Out_n having different durations and amplitudes.

The resistor capacitor pairs R1, C1 and R2, C2 provide load components at the two output terminals Out_p, Out_n. Resistance of resistor R1 may be the same or different than resistance of resistor R2. Capacitance of capacitor C1 may be the same or different than capacitance of capacitor C2. In an embodiment, the resistors R1 and R2 are replaced with transistors, such as MOSFETs. The resistor capacitor pairs R1, C1 and R2, C2 provide two RC loads that operate as low-pass filters, which convert a pair of current signals out of the input sub-circuit 901 into voltage signals Vp, Vn at output terminals Out-p and Out_n. A DC voltage exists across the output terminals Out_p and Out_n. The output voltages Vp, Vn are the differential output response of the skew detection circuit 900.

Although the skew detection circuit 900 is capable of detecting skew of high-speed complementary clocks outputting 10-250 gigahertz clock signals, the differential output of the skew detection circuit 900 is a low-frequency signal (e.g., a DC signal). This further minimizes power consumption. The skew detection circuit 900 allows for skew of high-frequency clock signals to be detected. An amplifier alone is unable to detect differences in high frequency clock signals. This is because it is difficult to detect changes of voltage of high-frequency clock signals (e.g., 10-250 gigahertz clock signals). The skew detection circuit 900 converts the high-frequency clock signals to a low-frequency output signal provided at output terminals Out_p, Out_n, which is used to drive a gain amplifier (e.g., the gain amplifier 822 of FIG. 8. A low-frequency output signal is provided due to incorporation of the RC circuit 910. The requirements for maintaining a certain signal edge rate and shape can be reduced for a low-frequency signal, as compared to a high-frequency signal, and thus less power is needed.

Figure 10:
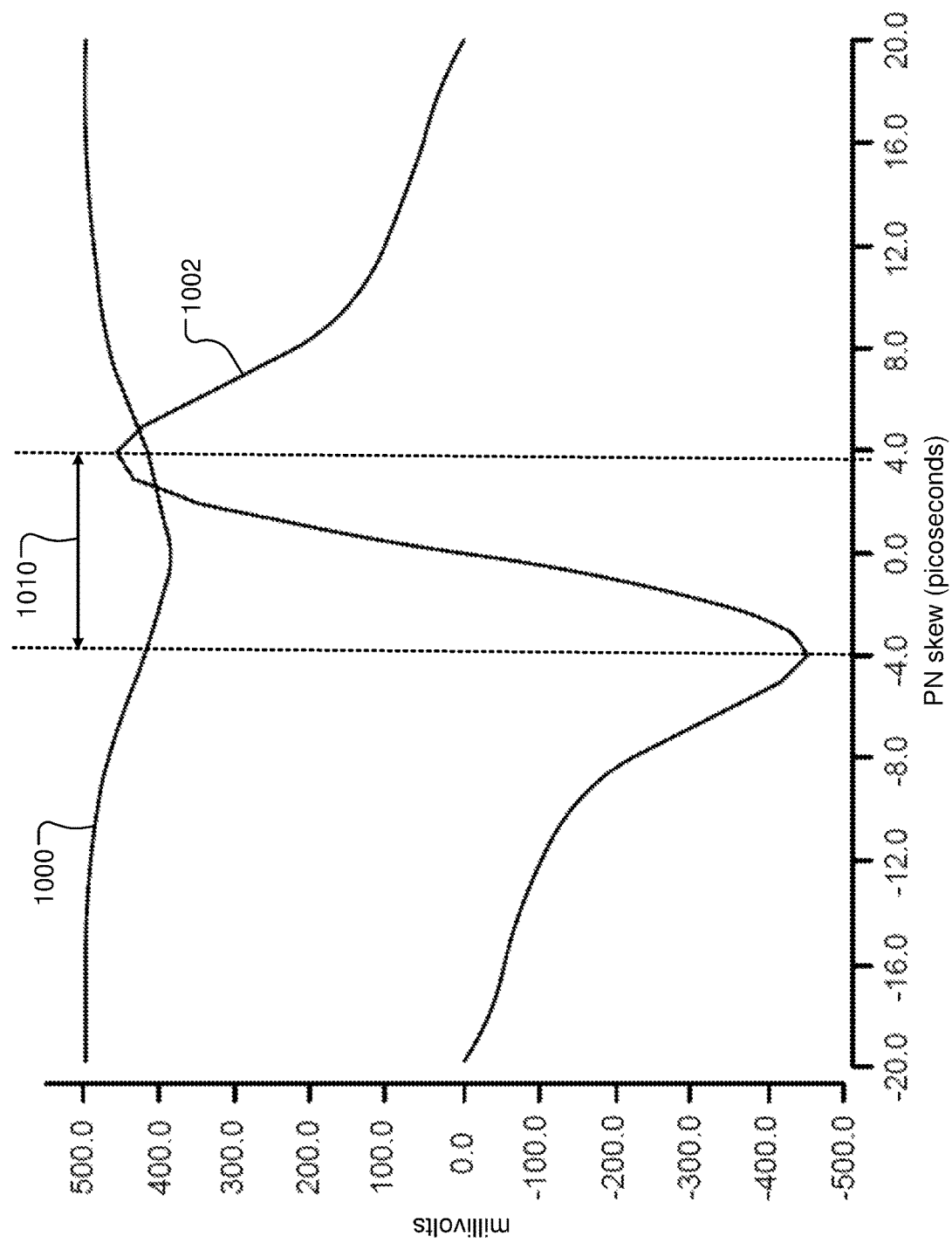
FIG. 10 is an example plot of common mode and differential mode representations of output voltage signals of the skew detection circuit of FIG. 9.

FIG. 10 shows a plot of common mode and differential mode representations 1000, 1002 of the output voltage signals Vp, Vn of the skew detection circuit 900 of FIG. 9. The common mode and differential mode representations 1000, 1002 are not of complementary clock signals, as are the plots of FIGS. 2 and 3. The plot is of millivolts (mV) versus PN skew. The common mode and differential mode representations 1000, 1002 are based on an output response of the skew detection circuit 900. FIG. 10 shows the differential mode representation (or output response) 1002, which is Out_p-Out_n, and the common mode representation (or output response) 1000, which is Out_p+Out_n)/2. The x-axis represents an amount of skew between the two clock signals clkp2, clkn2. The differential mode output response 1002 has a strong correlation to the skew between the two clock signals clkp2, clkn2 when the skew is small. This means a small amount of skew results in a large voltage response, which leads to accurate PN skew detection.

When the skew between the two complementary clock signals clkp2, clkn2 is small, the current pulses out of the sub-circuit 901 of FIG. 9 are also small, in terms of both duration and amplitude. This leads to lower output voltages Vp, Vn on both output terminals Out_p and Out_n, hence a lower common mode output response. When the skew is large, the amplitudes of the current pulses increase and the common mode output response 1000 increases. The increase in the common mode output response 1000 reduces a drain-to-source voltage drop Vds across each of the stacked transistors 902, 904, 906, 908 of FIG. 9, which in turn reduces the current through the stacked transistors 902, 904, 906, 908. Thus, a change in current pulse $DI_{skew}$ at the output terminals Out_p, Out_n and across the stacked transistors 902, 904, 906, 908 causes the shown variation in the common mode output response 1000 in FIG. 10. The variation of the common mode output response 1000 negatively affects skew correction operations including negatively affecting accurate detection of skew and generating corresponding feedback signals for the delay buffers D1, D2 of FIG. 8. The fluctuance of common mode output response 1000 affects transistor operating points and changes current generated from detection circuitry, which degrades accuracy of detection. A large workable operating range 1010 between a minimum and maximum peaks of the differential mode output response 1002 is shown in FIG. 10. In the workable operating range 1010, the transfer function of the skew detection circuit 900 is linear. Outside the workable operating range, the transfer function is not linear.

FIG. 11 shows a skew detection circuit with skew detection circuit 1100 that includes an input sub-circuit 1101 including cross-coupled and stacked transistors 1102, 1104, 1106, 1108 and an RC circuit 1110. The input sub-circuit 1101 operates as a voltage-to-current conversion circuit. The RC circuit 1110 operates as a current-to-voltage conversion circuit. The transistors 1102, 1104 provide a first arm of the input sub-circuit 1101. The transistors 1106, 1108 provide a second arm of the input sub-circuit 1101. The RC circuit 1110 includes a first resistor R1 and a second resistor R2. First terminals (e.g., source terminals) of transistors 1102, 1106 are connected to a first source terminal 1112, which is connected to a second source terminal 1114 via a current source 1116. The second source terminal 1114 is at a first voltage potential Vdd. Resistance of resistor R1 may be the same or different than resistance of resistor R2. A gate of transistor 1102 is connected to a gate of transistor 1108. A gate of transistor 904 is connected to a gate of transistor 1106.

Second terminals (e.g., drain terminals) of transistors 1102, 1106 are connected respectively to first terminals (e.g., source terminals) of transistors 1104, 1108. The second terminal (e.g., drain terminal) of transistor 1104 is connected to resistor R1 and capacitor C1. The resistor R1 is connected between the transistor 1104 and a third source terminal 1118, which is at a second voltage potential Vss. The second terminal (e.g., drain terminal) of transistor 1108 is connected to resistor R2 and capacitor C1. The resistor R2 is connected between the transistor 1108 and the second source terminal 1114. The resistors R1, R2 provide two loads, which convert a pair of current signals out of the input sub-circuit 1101 into voltage signals Vp, Vn at output terminals Out-p and Out_n. A direct current (DC) voltage exists across the output terminals Out_p and Out_n. The output voltages Vp, Vn are the differential output response of the skew detection circuit 1100.

The skew detection circuit 1100 further includes a common-mode stabilization circuit 1120, which includes a voltage divider provided by serially connected resistors Rsa, Rsb, an amplifier 1122, the current source 1116, and a capacitor C2. The voltage divider is connected in parallel with the capacitor C1. The capacitor C1 and the voltage divider are connected across output terminals Out_p, Out_n.

The amplifier 1122 compares a voltage output of the voltage divider Vd to a reference voltage Vref and adjusts current out of the current source 1116 based on a result of the comparison. In an embodiment, the reference voltage Vref is set to a voltage within the common mode differential (i.e., a voltage between the output voltages Vp, Vn). In an embodiment, the reference voltage Vref is set equal to i) a maximum magnitude of Vp minus a maximum magnitude of Vn divided by 2 (or (|Vpmax|−|Vnmax|)/2), and/or ii) a maximum difference between Vp and Vn divided by 2.

The stabilization circuit 1120 sets and stabilizes the output voltages Vp, Vn for the gain amplifier 822 of FIG. 8. This flattens the common mode response and improves accuracy of the skew detection circuit 1100. The larger the variation in the common mode response, the more performance of the gain amplifier 822 is negatively affected, which can result in an error in detecting skew. The voltage divider allows (Out_p−Out_n)/2 to be detected. The amplifier 1122 adjusts the current supplied to the sub-circuit 1101 based on (Out_p−Out_n)/2. In an embodiment, resistance of Rsa is equal to resistance of Rsb. In another embodiment, resistance of resistor Rsa is different than the resistance of Rsb.

For stabilizing output of the skew detection circuit 1100 to linearize the common mode representation of the output and setup operation of the gain amplifier. When the outputs of the skew detection circuit are not stable such that the common mode representation is not "flat" or constant, performance of the gain amplifier 822 is negatively affected such that errors can occur in adjusting the delay buffers D1, D2 and as a result cause errors in detecting existing skew. The difference in voltages Vp, Vn is indicative of the skew. Also, the levels of current through output terminals Out_p and Out_n are indicative of the skew. The stabilization circuit 1120 stabilizes the common mode (or (Vp+Vn)/2).

As shown, the skew detection circuit 1100 is similar to the skew detection circuit of FIG. 9. The skew detection circuit 1100 includes a sensor sub-circuit including resistors Rsa and Rsb between i) two output terminals Out_p, Out_n, and ii) a common terminal S from which a voltage Vd is drawn. The voltage divider provided by resistors Rsa, Rsb performs as a sensor for detecting the common mode output voltage Vd. The common mode output voltage Vd of the skew detection circuit 1100 is sensed at the common terminal S. An error signal represented by a difference between Vd and Vref is amplified by the amplifier 1122 to control the adjustable current source 1116 and complete the common mode feedback loop. A second capacitor is connected between the terminal 1112 and the third source terminal 1118, which is at the voltage potential Vss. The common mode feedback loop forces the combined currents flowing through the two arms of stacked transistors 1102, 1104, 1106, 1108 to be constant. As a result, the common mode output response remains constant and independent of skews of the complementary clock signals clkp2, clkn2. This aids in providing proper feedback signals for corresponding delay buffers D1, D2 of FIG. 8 to adjust respective clock input signals clkp and clkn and accurately align the two complementary clock output signals, clkp2, clkn2.

Figure 12:
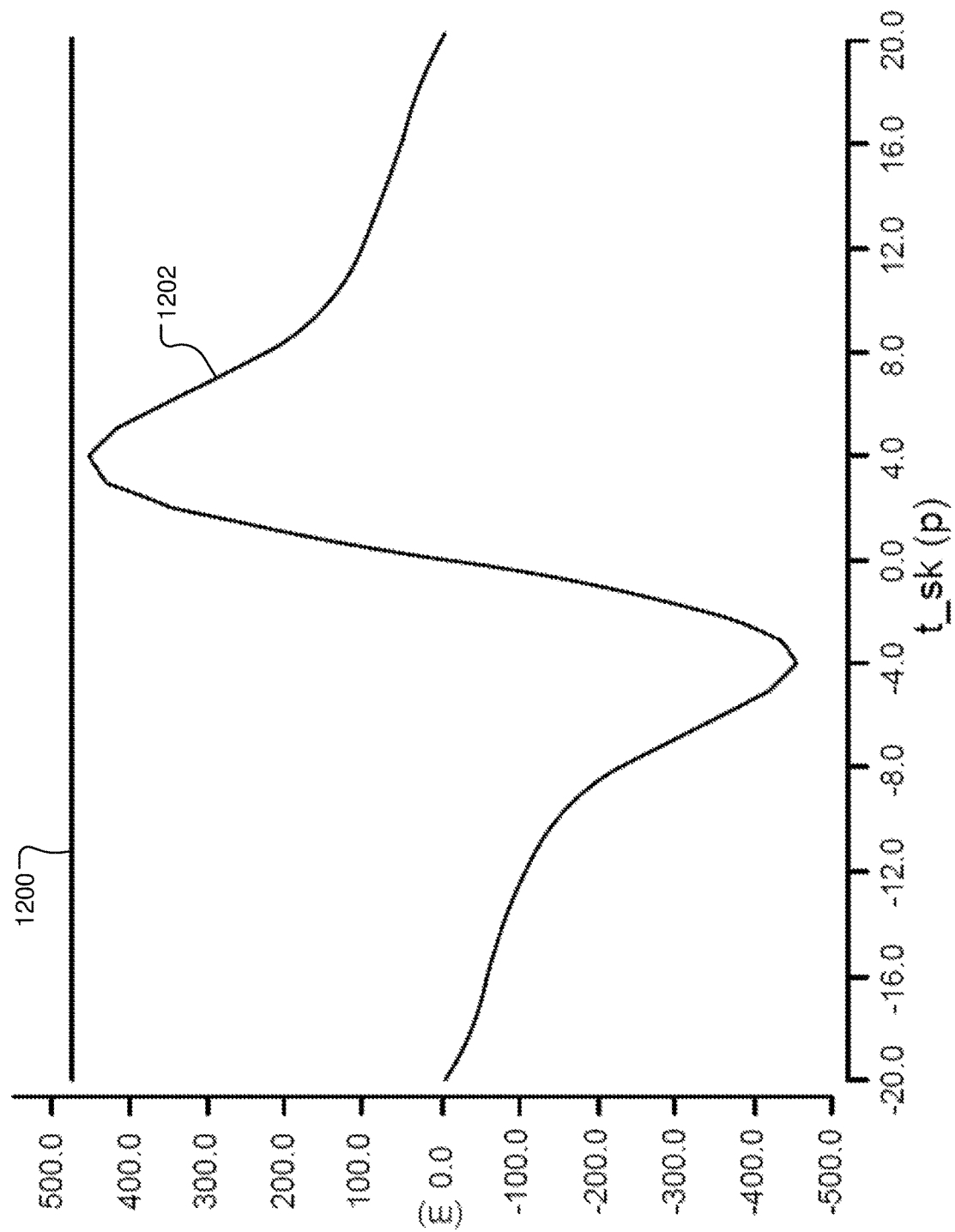
FIG. 12 is an example plot of common mode and differential mode representations of complementary clock signals provided by the skew detection circuit of FIG. 11.

The stabilization circuit 1120 of the skew detection circuit 1100 reduces common mode variation. FIG. 12 shows a plot of common mode representation (or output response) 1200 and a differential mode representation (or output response) 1202 of complementary clock signals provided based on outputs of the skew detection circuit 1100. As shown, the differential mode output response 1202 is similar to the differential mode output response 1002 of the skew detection circuit 900 of FIG. 9. The common mode output response 1200 is however subjected to feedback loop control, which senses the common mode output voltage Vd, compares the common mode output voltage Vd to the reference voltage Vref, generates an amplified error signal, and feeds back the amplified error signal back to control the adjustable current source 1116 and maintains a constant current through the two arms of stacked transistors 1102, 1104, 1106, 1108. This provides a common mode output response 1200 that is a constant value, as shown in FIG. 12.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure. Also, as used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A first network device comprising:
    a pair of clock tree circuits configured to generate a first output clock signal and a second output clock signal;
    a feedback path comprising
        a skew detection circuit configured to perform a voltage-to-current conversion of the first output clock signal and the second output clock signal to generate a pair of current signals, perform a current-to-voltage conversion of the pair of current signals to generate a pair of voltage signals, and detect a skew in the first output clock signal and the second output clock signal, the pair of voltage signals being indicative of the skew between the first output clock signal and the second output clock signal, and the second output clock signal being complementary to the first output clock signal, and
        a gain amplifier configured to amplify the pair of voltage signals and based on the amplified pair of voltage signals, to adjust respective delays in the first output clock signal and the second output clock signal; and
    a transceiver configured, based on the first output clock signal and the second output clock signal, to control transfer of data to or from a second network device, the second network device being separate from the first network device.

2. The first network device of claim 1, wherein the skew detection circuit comprises:
    a voltage-to-current conversion circuit configured to receive the first output clock signal and the second output clock signal, and to convert voltages of the first output clock signal and the second output clock signal to provide the pair of current signals; and
    a current-to-voltage conversion circuit configured to convert the pair of current signals to the pair of voltage signals.

3. The first network device of claim 2, wherein the voltage-to-current conversion circuit comprises a stack of cross-coupled transistors configured to receive and convert voltages of the first output clock signal and the second output clock signal to the pair of current signals.

4. The first network device of claim 3, wherein the stack of cross-coupled transistors comprise:
    a first transistor;
    a second transistor;
    a third transistor cross-coupled with the second transistor, gates of the second transistor and the third transistor configured to receive the second output clock signal; and
    a fourth transistor cross-coupled with the first transistor, gates of the fourth transistor and the first transistor configured to receive the first output clock signal.

5. The first network device of claim 3, wherein the stack of cross-coupled transistors are connected between a first source terminal at a first voltage potential and a pair of output terminals, the pair of output terminals providing the pair of voltage signals.

6. The first network device of claim 2, wherein the current-to-voltage conversion circuit comprises a resistor capacitor (RC) circuit configured to convert the pair of current signals to the pair of voltage signals.

7. The first network device of claim 6, wherein:
    the voltage-to-current conversion circuit comprises a first output terminal and a second output terminal; and
    the RC circuit comprises
        a first RC circuit implemented as a first load on the first output terminal, and
        a second RC circuit implemented as a second load on the second output terminal.

8. The first network device of claim 7, wherein:
    the first RC circuit comprises a first resistor and a first capacitor, the first resistor and the first capacitor being connected in parallel; and
    the second RC circuit comprises a second resistor and a second capacitor, the second resistor and the second capacitor being connected in parallel.

9. The first network device of claim 2, wherein:
    the voltage-to-current conversion circuit comprises a first output terminal and a second output terminal; and
    the current-to-voltage conversion circuit comprises
        a first resistor implemented as a first load on the first output terminal,
        a second resistor implemented as a second load on the second output terminal, and
        a capacitor connected across the first output terminal and the second output terminal.

10. The first network device of claim 2, further comprising a stabilizing circuit configured to stabilize the pair of voltage signals including minimizing a common mode response variation of the pair of voltage signals.

11. The first network device of claim 10, wherein the stabilizing circuit comprises:
    a sensor configured to detect a voltage, the voltage being based on the pair of voltage signals; and
    an amplifier configured to compare the voltage to a reference voltage, and to control current supplied to the voltage-to-current conversion circuit based on a result of the comparison.

12. The first network device of claim 11, wherein:
    the voltage-to-current conversion circuit comprises a first output terminal and a second output terminal;
    the current-to-voltage conversion circuit comprises a capacitor connected across the first output terminal and the second output terminal; and
    the sensor is implemented as a voltage divider connected in parallel with the capacitor.

13. The first network device of claim 11, wherein the amplifier is configured to control current supplied to the voltage-to-current conversion circuit to provide a common mode response of the pair of voltage signals that remains at a constant value for a linear operating range of a differential mode response of the pair of voltage signals.

14. The first network device of claim 2, wherein:
the voltage-to-current conversion circuit is connected to a first source terminal and to a pair of output terminals; and
the current-to-voltage conversion circuit is connected to a second source terminal and to the pair of output terminals,
wherein the pair of output terminals output the pair of voltage signals.

15. The first network device of claim 1, wherein the first output clock signal and the second output clock signal are pseudo-differential clock signals.

16. The first network device of claim 1, further comprising a pair of input delay buffers configured to receive a pair of complementary clock signals,
wherein the pair of clock tree circuits are connected to receive outputs of the pair of input delay buffers and are configured, based on the outputs, to generate the first output clock signal and the second output clock signal.

17. The first network device of claim 16, wherein the gain amplifier is configured to adjust delay of the pair of input delay buffers based on the amplified pair of voltage signals to align the first output clock signal to the second output clock signal.

18. The first network device of claim 16, wherein:
the pair of input delay buffers comprise a first input delay buffer and a second input delay buffer; and
the pair of clock tree circuits comprise
a first clock tree circuit comprising a first plurality of amplifiers connected in series and amplifying an output of the first input delay buffer, and
a second clock tree circuit comprising a second plurality of amplifiers connected in series and amplifying an output of the second input delay buffer.

19. The first network device of claim 18, wherein the first plurality of amplifiers and the second plurality of amplifiers amplify current.

20. The first network device of claim 18, wherein:
the first plurality of amplifiers increase in size from the first input delay buffer to a first output terminal of a first one of the pair of clock tree circuits and have different levels of amplification; and
the second plurality of amplifiers increase in size from the second input delay buffer to a second output terminal of a second one of the pair of clock tree circuits and have different levels of amplification.

21. The first network device of claim 16, wherein:
the pair of input delay buffers comprise
a first input delay buffer configured to receive a first complementary clock signal of the pair of complementary clock signals, and
a second input delay buffer configured to receive a second complementary clock signal of the pair of complementary clock signals, the second complementary clock signal having an opposite polarity than the first complementary clock signal;
the pair of clock tree circuits comprise
a first clock tree circuit configured to process an output of the first input delay buffer to generate the first output clock signal with a first phase, and
a second clock tree circuit configured to process an output of the second input delay buffer to generate the second output clock signal with a second phase;
the skew detection circuit is configured to detect at least one error in at least one of the first phase and the second phase; and
the gain amplifier is configured to amplify the at least one error and adjust at least one of a delay of the first input delay buffer and a delay of the second input delay buffer to align the first output clock signal to the second output clock signal.

\* \* \* \* \*